United States Patent
Chu et al.

(10) Patent No.: US 9,851,964 B2
(45) Date of Patent: Dec. 26, 2017

(54) PROCESS MANAGEMENT PROVIDING OPERATING MODE SWITCHING WITHIN AN ELECTRONIC DEVICE

(75) Inventors: Shiqiang Chu, Highlands Ranch, CO (US); Kan Man Wong, Highlands Ranch, CO (US); Keith Gerhards, Parker, CO (US); Michael Steinert, Centennial, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 1889 days.

(21) Appl. No.: 12/846,052

(22) Filed: Jul. 29, 2010

(65) Prior Publication Data
US 2011/0078434 A1    Mar. 31, 2011

Related U.S. Application Data

(60) Provisional application No. 61/229,572, filed on Jul. 29, 2009.

(51) Int. Cl.
*G06F 9/48* (2006.01)
*G06F 9/445* (2006.01)
*G06F 9/46* (2006.01)

(52) U.S. Cl.
CPC .............. G06F 8/665 (2013.01); G06F 9/468 (2013.01)

(58) Field of Classification Search
None
See application file for complete search history.

(56) References Cited

U.S. PATENT DOCUMENTS 6,931,525 B2 *  8/2005  Numata et al. ................. 710/10
2008/0104354 A1 *  5/2008  Cammarata et al. ......... 711/170

* cited by examiner

*Primary Examiner* — Idriss N Alrobaye
*Assistant Examiner* — Dayton Lewis-Taylor
(74) *Attorney, Agent, or Firm* — Seed IP Law Group LLP

(57) ABSTRACT

A method of process management for facilitating switching of operating modes within an electronic device is presented. In the method, the electronic device initiates a first process associated in a configuration file with a first operating mode of the device. The configuration file includes an indication as to whether the first process is authorized to request a switch to a second operating mode of the device. A request to switch to the second operating mode is received from the first process. The device determines by way of the indication whether the first process is authorized to issue the request. If the first process is authorized to issue the request, the device initiates a second process associated in the configuration file with the second operating mode in response to the request.

20 Claims, 8 Drawing Sheets

PROCESS MANAGEMENT PROVIDING OPERATING MODE SWITCHING WITHIN AN ELECTRONIC DEVICE

CROSS-REFERENCE TO RELATED APPLICATIONS

This application claims the benefit of U.S. Provisional Application No. 61/229,572, entitled "Process Management Providing Operating Mode Switching within an Electronic Device", filed Jul. 29, 2009, which is hereby incorporated by reference herein in its entirety.

BACKGROUND

Both general-purpose and embedded computing systems often employ operating system software or firmware to control and manage the operation of multiple software or firmware "processes" or applications running concurrently on the computing system, each of which addresses or handles a particular aspect or event within the computing system. While a general-purpose computer system, such as a personal computer, is generally capable of executing any program designed to be compatible with the operating system by way of these processes, embedded computing systems, such as mobile communication devices, data storage systems, audio/video entertainment components, and many others, typically employ multiple processes to perform various tasks, often in real-time, and typically using hardware of some restricted capability or performance compared to many general-computing platforms.

In a general-purpose computing system, the operating system software of the computing system often employs an initialization process to initiate or "spawn" several other processes or applications that are utilized to render the computing system operational by providing a console by which a user may access the computing system. For example, the Unix and Linux operating systems employ a parent process named init to create other processes listed in a file named inittab. Generally, these spawned processes include processes that allow users to log in to the computer system, as well as more autonomous processes or daemons necessary for system operation. Once these processes are initiated, the system typically operates in a normal operating mode, whereby control of the operation of the system is dictated primarily by the actions of the user by way of a wide range of user-selected applications run on the system.

In the case of embedded computing systems, user access and control is generally restricted to user commands for guiding the primary operation of the embedded system. For example, a satellite or cable television receiver or "set-top box" often provides commands that are closely associated with the receiving and recording of audio/video programming, as opposed to allowing the user to run a range of applications similar to those associated with a general-purpose system.

However, embedded systems are often required to function periodically in an operating mode other than the mode normally associated with the system. For example, in television set-top boxes and other embedded systems, the firmware resident in the system may require periodic updating. To facilitate such updating, the system often suspends its normal operating mode in favor of a "firmware update" operating mode since the firmware used to perform normal operations is being rewritten in memory. Once the updating of the firmware is complete, the system may then resume normal operations.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
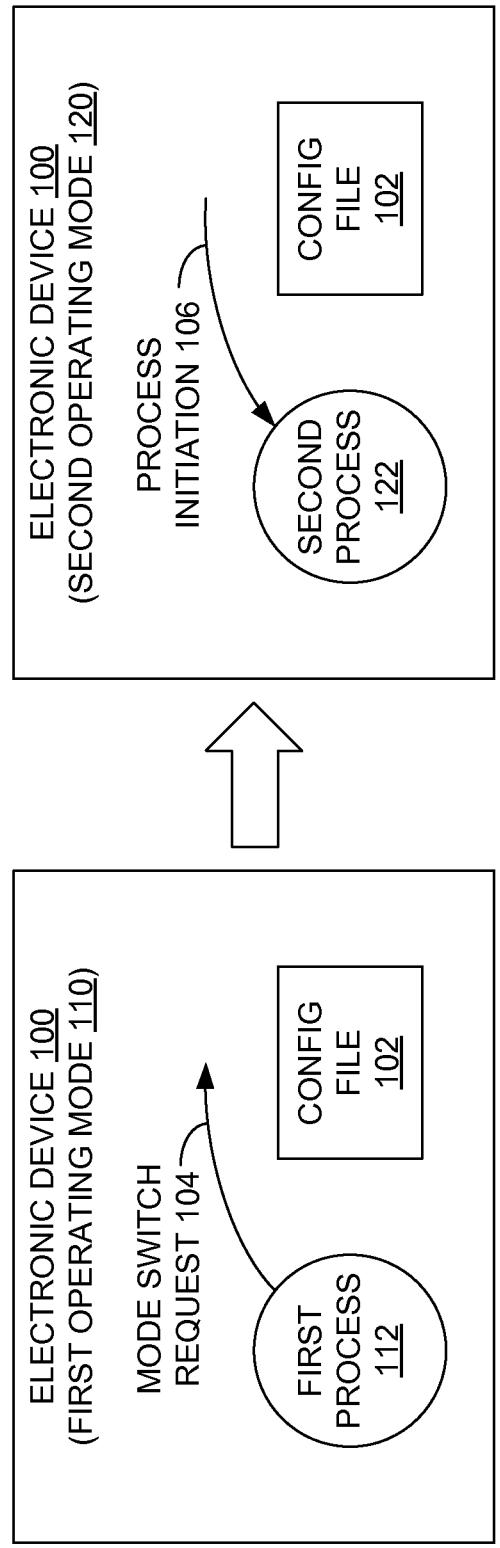
FIG. 1 is a graphical representation of an electronic device configured to switch between two operating modes according to an embodiment of the invention.

FIG. 1 provides a graphical representation of an electronic device 100 providing process management capable of switching between operating modes 110, 120 of the device 100. The electronic device 100 may be a general-purpose computing system, an embedded computing system, or another electronic device capable of initiating and executing one or more software or firmware processes. Generally, a process is an executable application or program that executes with its own separate state information, including its own address space. A process may execute concurrently with other processes within the electronic device 100 to exploit any potential parallelism in performing multiple tasks. Further, a process may include one or more executing "threads" which may also execute in parallel, typically while sharing the memory space and state information of the hosting process.

In one embodiment, an operating mode 110, 120 may be defined by some predetermined set of software or firmware processes operating within the electronic device 100. In the particular example of FIG. 1, the first operating mode 110 of FIG. 1 involves the initiation and execution of a first process 112, while the second operating mode 120 is associated with a second process 122. In other implementations, other processes aside the first process 112 and the second process 122 may be operating concurrently during each of the operating modes 110, 120, respectively, but such processes are not depicted in FIG. 1 to simplify the following discussion. Further, one or more processes of FIG. 1 may operate within both the first operating mode 110 and the second operating mode 120. Moreover, some processes may be initiated while others are terminated while a particular operating mode 110, 120 remains in effect.

In some implementations, each operating mode 110, 120 may be referred to as a separate "use case" for the electronic device 100, wherein each use case signifies a particular way or mode of operating the electronic device 100 or its components. For example, one use case for the electronic device 100 may be a normal operating mode in which the electronic device 100 operates as it is intended for the benefit of the user. Another use case for the same device 100 may be a diagnostic or development operating mode, through which designers or developers of the device 100 may access specific data structures, log important events, and perform other tasks not typically associated with the normal operating mode. Yet another use case for the device 100 may address the updating of firmware or software in the device 100, during which much of the capability associated with a normally operating device 100 may be temporarily unavailable.

Figure 2:
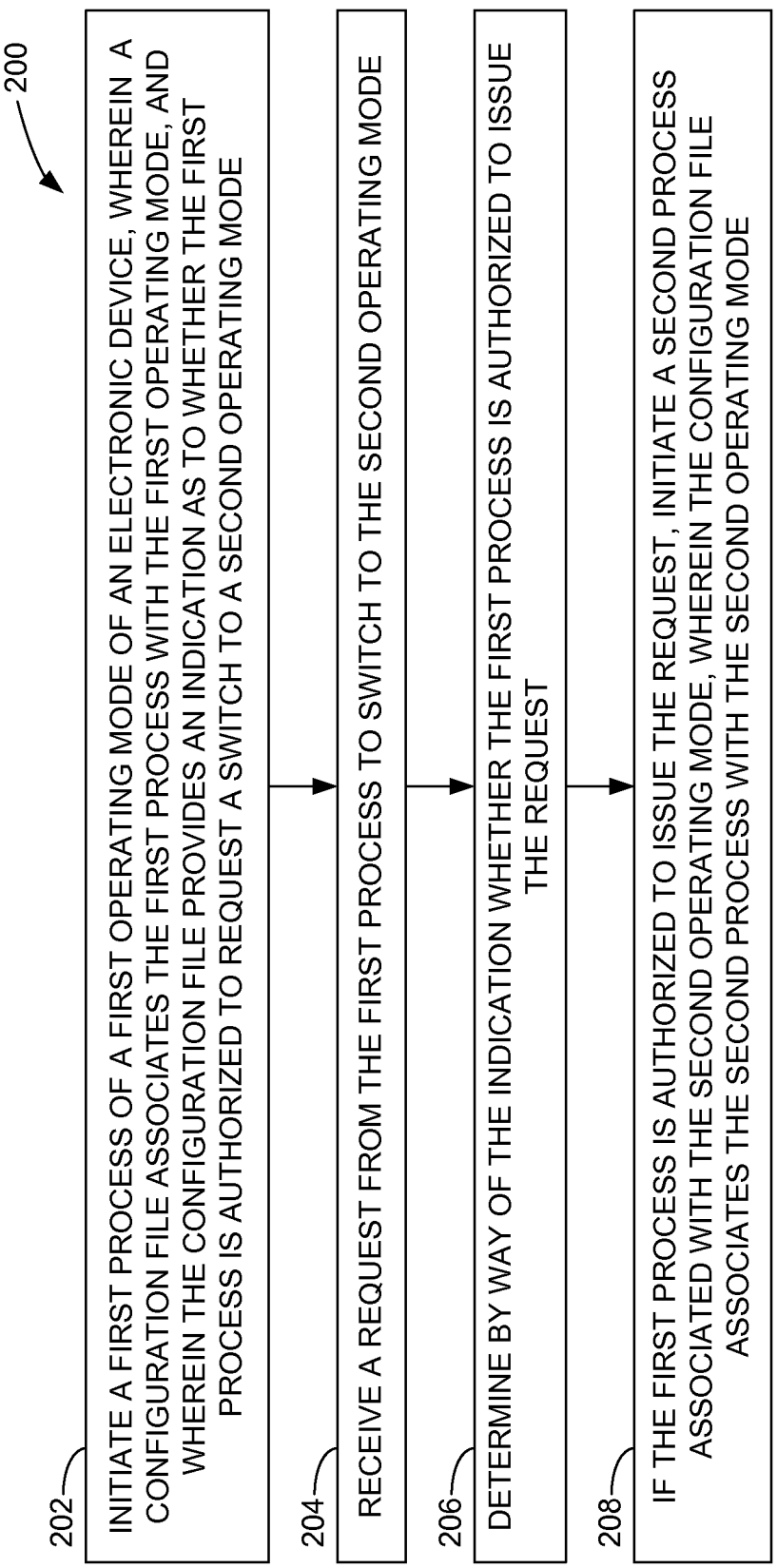
FIG. 2 is a flow diagram of a method according to an embodiment of the invention for facilitating switching of operating modes in an electronic device.

FIG. 2 presents a flow diagram of a method 200 of process management for switching of operating modes in the device 100 of FIG. 1. In the method 200, the first process 112 of the first operating mode 110 is initiated (operation 202). The first process 112 is associated with the first operating mode 110 by way of a configuration file 102 denoting that association. The configuration file 102 further provides an indication as to whether the first process 112 is authorized to request a switch to the second operating mode 120. A request 104 from the first process 112 to switch to the second operating mode 120 is received (operation 204). A determination is then made by way of the indication in the configuration file 102 as to whether the first process 112 is authorized to issue the request 104 (operation 206). If the first process 112 is authorized to issue the request 104, the second process 122 associated with the second operating mode 120 is initiated 106 (operation 208). As with the first process 112 and the first operating system 110, the second process 122 is associated with the second operating mode 120 in the configuration file 102.

While the operations of FIG. 2 are depicted as being executed in a particular order, other orders of execution, including concurrent execution of two or more operations, may be possible. In another embodiment, a computer-readable storage medium may have encoded thereon instructions for at least one processor or other control circuitry of the electronic device 100 of FIG. 1 to implement the method 200.

As a result of at least some embodiments of the method 200, the configuration file 102 serves to identify the various processes 112, 122 that are to be initiated and executed in association with a particular operating mode 110, 120 of the electronic device 100. Further, the configuration file 102 provides a measure of security by allowing only predetermined processes 112, 122 to initiate a switch from one operating mode 110, 120 to another. Other advantages may be recognized from the various implementations of the invention discussed in greater detail below.

Figure 3:
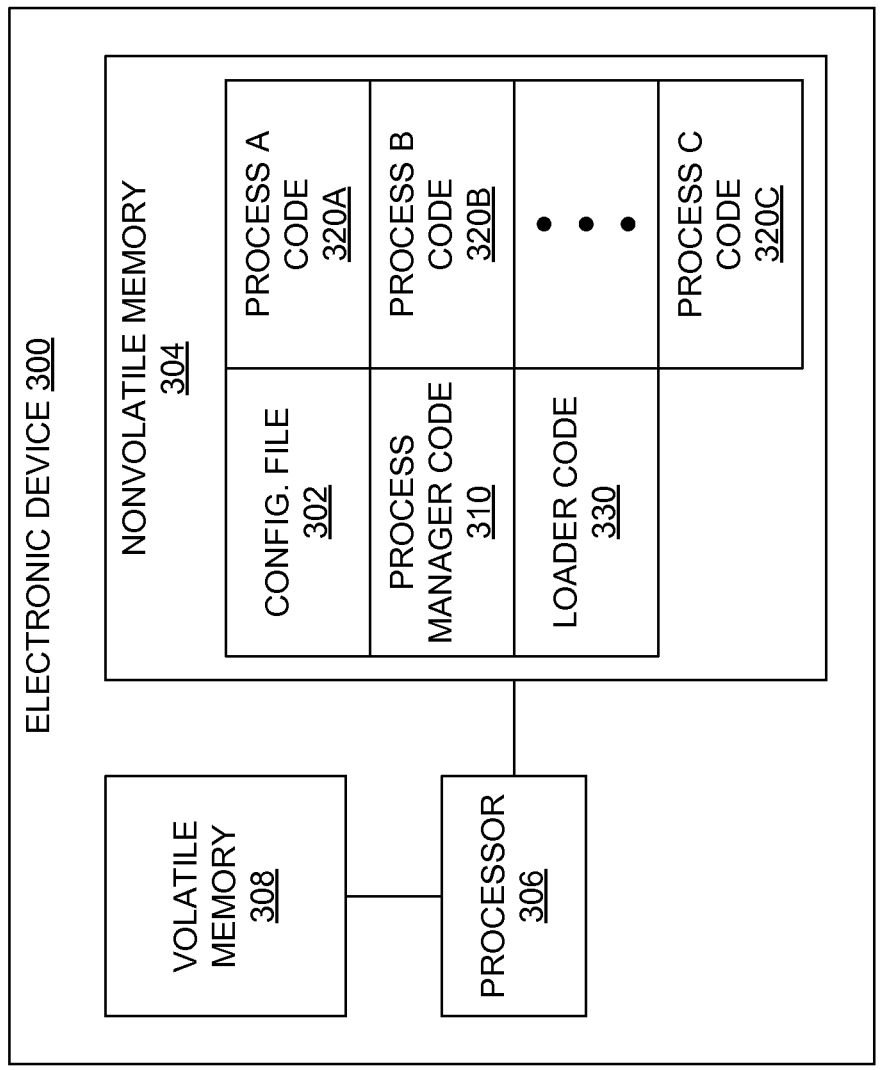
FIG. 3 is a block diagram of an electronic device and included configuration file according to an embodiment of the invention.

FIG. 3 is a block diagram of an electronic device 300 according to another embodiment of the invention. The device 300 includes a processor 306, nonvolatile memory 304, and volatile memory 308. Other components, including, but not limited to, a user interface, signal transmitters and receivers, and a power supply, may also be included in the electronic device 300, but such components are not explicitly shown in FIG. 3 nor discussed below to simplify the following discussion.

The processor 306 is configured to control various aspects of the electronic device 300 by way of executing the software or firmware instructions shown as residing in the nonvolatile memory 304. The processor 306 may include one or more processors, such as microprocessors, microcontrollers, or digital signal processors (DSPs), configured to execute the instructions.

The nonvolatile memory 304 coupled with the processor 306 includes a configuration file 302, and firmware or software instructions or code executable by the processor 306. In the specific example of FIG. 3, the instructions include process manager code 310, and code for several different processes to be initiated and managed by the process manager code 310, such as code 320A for a process "A", code 320B for a process "B", and so on. Also included in the nonvolatile memory 304 is loader code 330 for loading some or all of the configuration file 302, process manager code 310, and process code 320 from the nonvolatile memory 304 to the volatile memory 308. In one example, the nonvolatile memory 304 may be a flash memory capable of being reprogrammed with updated versions of the configuration file 302, process manager code 310 and process code 320, although any nonvolatile memory capable of storing such data, including various forms of read-only memory (ROM), may be employed for the nonvolatile memory 304 of FIG. 3.

The processor 306 is also coupled with the volatile memory 308, which may include dynamic random-access memory (DRAM), static random-access memory (SRAM), or any other volatile memory technology, or combinations thereof. In addition to storing the code 310, 320, and the configuration file 302 from the nonvolatile memory 304, the volatile memory 308 may also include any data, such as local or global variables, that may be required for the processor 306 to execute the instructions of the code 310, 320.

Prior to executing any of the process code 320, the processor 306, typically upon powering up the electronic device 300, executes the loader code 330 to store the configuration file 302, the process manager code 310, and the process code 320 from the nonvolatile memory 304 to the volatile memory 308. In one example, the processor 306 moves the loader 330 from the nonvolatile memory 304 to the volatile memory 308 before executing the code of the loader 330, while in another implementation, the processor 306 executes the loader code 330 directly from the nonvolatile memory 304. In addition, the nonvolatile memory 304 may include security data, such as a checksum, that the processor 306 may utilize to verify that the contents of the nonvolatile memory 304 have not been corrupted before transferring the contents to the volatile memory 308. In yet another example, the code may be loaded into the volatile memory 308 first, and then checked for integrity prior to execution.

Typically, the use of the volatile memory 308 for storing the code sections 310, 320 and the configuration file 302 allows faster access to those instructions than what may be available directly from the nonvolatile memory 304. Further, execution of instructions from the volatile memory 308 allows the processor 306 to update the code 320 and other data stored in the nonvolatile memory 304 by executing instructions in the volatile memory 308. In other implementations, the processor 306 may not store the code 310, 320 or other data from the nonvolatile memory 304 to the volatile memory 308, but may instead execute the code 310, 320 directly from the nonvolatile memory 304. In that case, the processor 306 may store only the data, such as local variables, global variables, and the like, related to the execution of instructions in the volatile memory 308.

Generally, the configuration file 302 includes data indicating which processes are associated with which of multiple operating modes undertaken by the electronic device 300. The data included in the configuration file 302 is discussed more fully below. In one embodiment, the configuration file 302 is configured as a text file, such as an eXtensible Markup Language (XML) file. Under that scenario, the processor 306 may be configured to convert the data presented in the configuration file 302 into multiple data structures stored in the volatile memory 308 and accessible during execution of the process manager code 310. Depending on the implementation, the processor 306 may perform the conversion directly from the configuration file 302 as stored in the nonvolatile memory 304, or may transfer the configuration file 302 to the volatile memory 308 before performing the conversion. In the latter case, the processor 306 may then delete the copy of the configuration file 302 in the volatile memory 308 after performing the conversion. In other embodiments, the configuration file 302 may be a data file that requires no conversion.

Figure 4A:
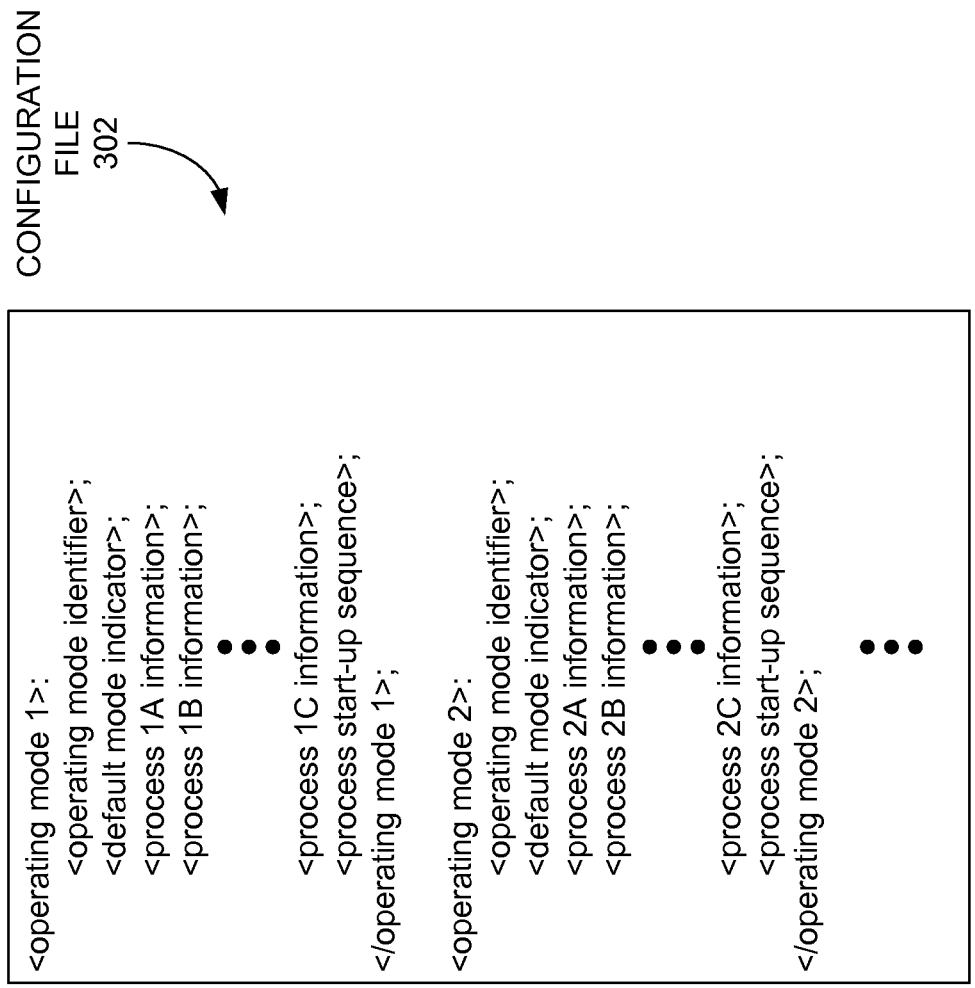
FIG. 4A is a listing of information provided in the configuration file of FIG. 3 according to an embodiment of the invention.
Figure 4B:
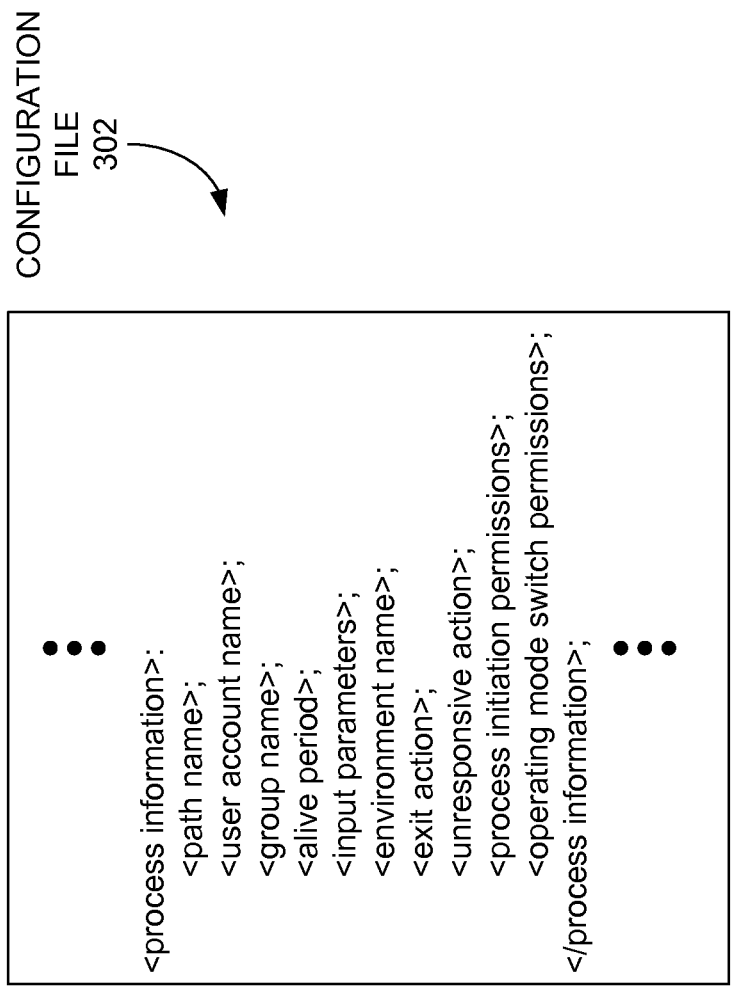
FIG. 4B is a listing of information for each process identified in the configuration file of FIG. 3 according to an embodiment of the invention.

FIGS. 4A and 4B provide an example of the information that may be included in the configuration file 302, such as an XML file. For instance, each operating mode in which the electronic device 300 is to operate may be listed. Each operating mode may also be associated with an operating mode identifier, as well as an indication as to whether that operating mode is the default operating mode for the device 300. Thus, barring a specific indication to initiate a particular operating mode, the device will assume the default operating mode. In one implementation, the default operating mode may be the initial operating mode of the device 300 after a reset or power-up condition.

Also associated with each operating mode is a list of processes associated with that operating mode, along with specific control information associated with each process. In other words, processes associated with a particular operating mode are initiated in the electronic device 300 when the electronic device 300 is to operate in that mode. In the specific example of FIG. 4A, processes 1A, 1B, . . . , and 1C are associated with operating mode 1, while processes 2A, 2B, . . . , and 2C are identified with operating mode 2. An example of the information included for each of the processes of FIG. 4A is presented in FIG. 4B.

The information for each of the operating modes may also include a process start-up sequence to be applied when the operation mode is first initiated. Such a start-up sequence may be important in cases in which one process must already be executing before another may begin executing. In one embodiment, the process start-up sequence is indicated by the order in which the process information is presented in the configuration file 302. Additionally, the information for each operating mode may include one or more commands to be executed among the initiation of the various processes associated with the operating mode. In some examples, a command may be executed and completed before initiating the next process in the start-up sequence.

The information that may be presented for each of the processes of FIG. 4A is listed in FIG. 4B. For example, each process may have a path name through which the firmware or software associated with that process may be found. To identify the process, a "user account name" may also be specified. The process may also be associated with a "group name", by which multiple processes may be associated with each other. Such a group of processes may have similar access privileges within the device 300, may be initiated at approximately the same time, or have any other trait or characteristic in common.

Another data item provided in the configuration file 302 for each process may be a recurring "alive" period, during which the process must indicate that it is still responsive (i.e., not stalled or "hung"). Once the process provides such an indication, the alive period is reset, thus requiring the process to indicate its responsiveness repeatedly, with no more than an alive period elapsing between each indication. The value for the alive period may be stated in any time increment understood within the electronic device 300, such as microseconds, milliseconds, number of system clock periods, and so on. Each process listed in the configuration file 302 may be associated with a different alive period.

Also included in the configuration information for each process may be one or more input parameters or arguments to be passed to the process being initiated. As a result, the initiation, as well as the subsequent execution, of the initiated process may be tailored or adjusted based on the contents of the configuration file 302.

Further, a specific "environment" may be associated with each process. In one example, the environment may include a path or location whereby the process may access one or more driver modules for utilizing various hardware aspects of the electronic device 300. In this case, the configuration file 302 may allow various hardware configurations of the device 300 to be serviced by the same process firmware or software. Other information relating the process to a particular device arrangement or environment may be provided in the configuration file 302 in other embodiments.

For each process, the configuration file 302 may also direct the electronic device 300 to perform a specific action when that process exits its code. Such actions may include, but are not limited to, one or more of restarting the process, starting a separate diagnostic process, restarting or rebooting the electronic device 300, and not performing any action. As a result, the electronic device 300 may initiate an action in response to one process exiting, and may perform a different action in response to another process exiting. Similarly, the configuration file may require the device 300 to initiate a different action for each process when that process becomes unresponsive, or "hangs". Such an action may include, for example, at least one of terminating the process, starting a diagnostic process, restarting the device 300, and not performing any action. Further, each such action after exiting or hanging may include a series of multiple actions listed in the configuration file 302.

In some implementations, one process may initiate another process. To control which processes may initiate others, the configuration file 302 may further include one or more process initiation permissions for each of several processes. For example, a process A may be permitted to initiate processes B and C, while process B may only initiate process C, and process C may not be allowed to initiate any other processes. As a result of providing such information, the configuration file 302 provides a means by which security and control may be maintained over how new processes may be initiated or spawned.

Similarly, the configuration file 302 may designate which of the processes listed in the file 302 may initiate a switch from a current operating mode of the device to another operating mode. This information may also indicate the target operating modes allowed for each process permitted to initiate an operating mode switch. Other information, such as particular states during which a process may be permitted to request a particular operating mode switch, may also be included in the operating mode switch permissions for each process.

Figure 5:
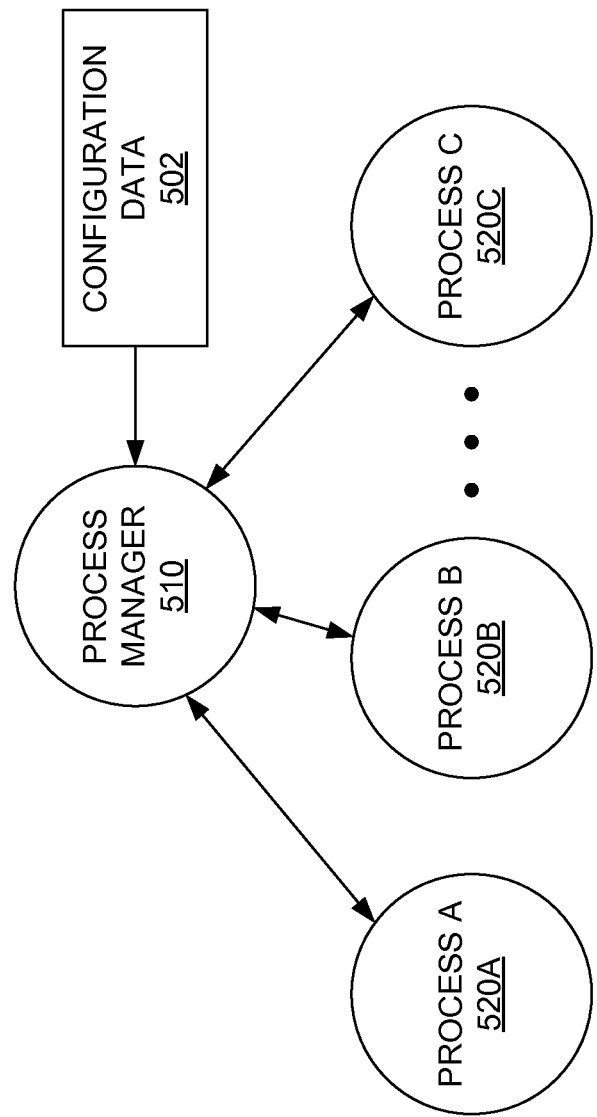
FIG. 5 is a graphical depiction of a process manager and multiple spawned processes according to an embodiment of the invention.

FIG. 5 is a graphical representation of a process manager process 510 executing within the electronic device 300 based on the process manager code 310 of FIG. 3. Generally, the process manager 510 accesses configuration data 502 derived from the configuration file 302 of FIG. 3 to manage the initiation, execution, and termination of multiple processes 520A, 520B, 520C, each of which is based on its corresponding process code 320 of FIG. 3. While FIG. 3 depicts three specific processes 520, the processor 306 may execute more or fewer processes 520 at any particular time. Further, the processes 520 and the process manager 510 may execute atop an operating system, such as Unix, Linux, VxWorks®, or another standard or real-time operating system.

Figure 6:
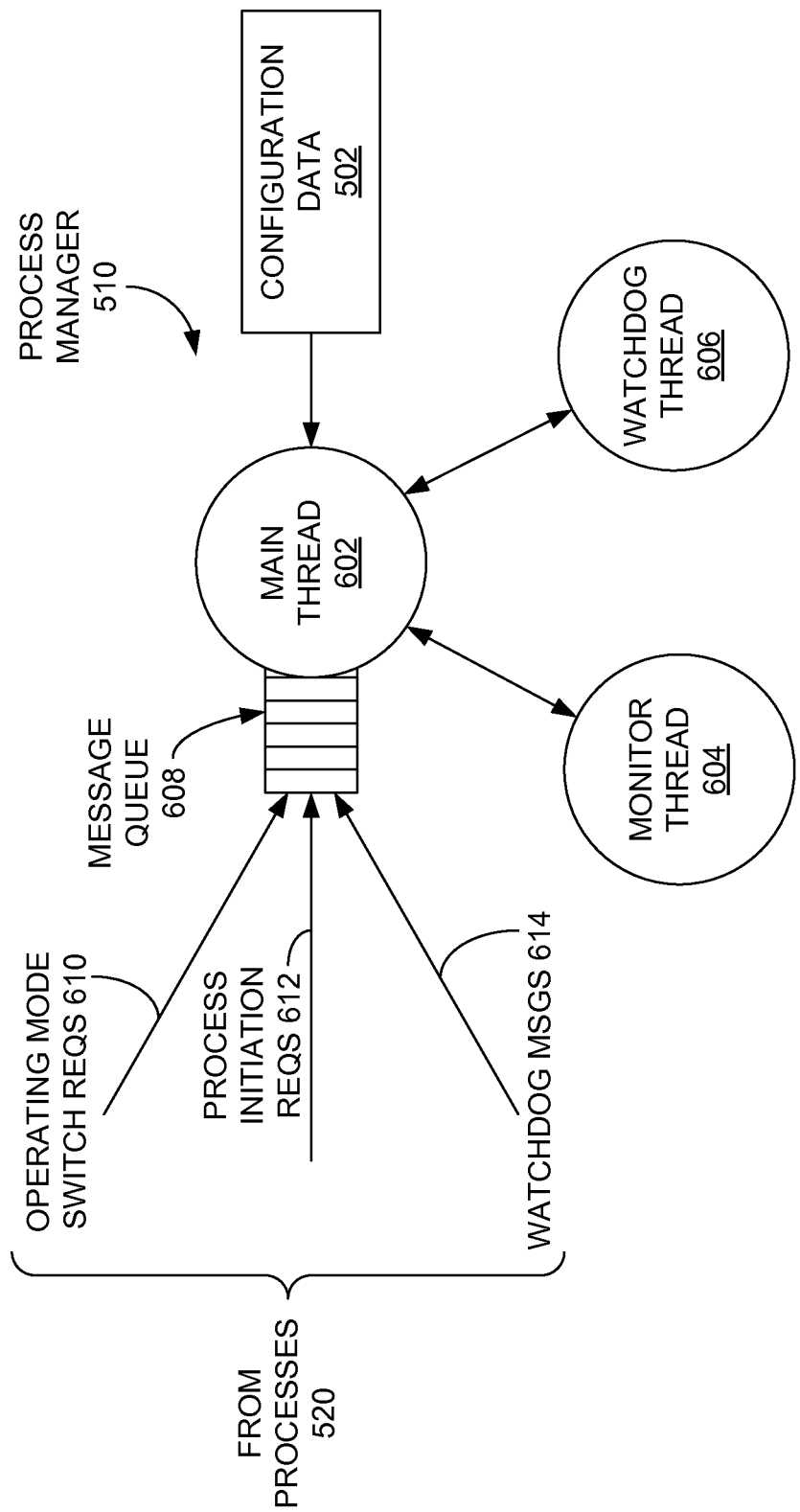
FIG. 6 is a graphical depiction of execution threads employed in the process manager of FIG. 5 according to an embodiment of the invention.

FIG. 6 provides a slightly more detailed representation of the process manager 510 employing multiple execution threads 602, 604, 606 according to one embodiment. More specifically, the process manager 510 includes a main thread 602, a monitor thread 604, and a "watchdog" thread 606. In one example, the main thread 602 initiates and communicates with the monitor thread 604 and the watchdog thread 606. The main thread 602 is also communicatively coupled with a message queue 608 that receives messages from the other processes 520 controlled by the process manager 510. However, other methods by which such communication may occur, such as pipes, mailboxes, and other software communication constructs, may be employed in other arrangements. Among the messages received from the processes 520 by way of the message queue 608 are operating mode requests 610, process initiation requests 612, and watchdog messages 614, each of which is described in greater detail below.

The main thread 602 also processes the messages 610, 612, 614 received by way of the message queue 608, sometimes with the aid of the monitor thread 604. For example, in response to an operating mode request 610, the main thread 602 checks the configuration data 502 to determine if the requesting process 520 is permitted to request that particular operating mode change. If not, the request 610 is ignored or denied. Otherwise, the main thread 602 may signal the monitor thread 604 to perform the requested operating mode switch. In one example, the switch may occur by terminating those currently operating processes 520 that are not listed in the configuration data 502 as being associated with the new operating mode, and initiating the processes 520 identified in the configuration data 502 with the new operating mode. To perform these tasks, the monitor thread 604 may receive the necessary configuration data 502 from the main thread 602, or may access the configuration data directly 502. In another example, the main thread 502 may perform the process termination and initiation tasks associated above with the monitor thread 604.

The main thread 602 also handles the process initiation requests 612 received by way of the message queue 608. For instance, in response to a process initiation request 612, the main thread 602 consults the configuration data 502 to determine if the requesting process 520 is permitted to request the initiation of that proposed process 520. If not, the request 612 is ignored or denied. Otherwise, the main thread 602 may signal the monitor thread 604 to perform the requested process initiation. In another example, the monitor thread 604 may consult the configuration data 502 directly to determine whether the requesting process 520 is entitled to request the initiation, and then perform the initiation if the requesting process 520 is permitted to do so. To perform the initiation, the main thread 604 may pass the request 612, or at least the identity of the process 520 to be started, to the monitor thread 604. In another example, the main thread 502 may perform the process initiation itself without any involvement by the monitor thread 604. In some examples, the requesting process 520 may also provide one or more input parameters, such as those supplied in the configuration file 302, which the main thread 604 or the monitor thread 604 may employ to initiate the new process. Providing the input parameters in such a manner thus facilitates the generation of variable input parameters by an active process 520, as opposed to the static, or "hardcoded", parameters stored in the configuration file 302.

Once the new process 520 has been initiated, the new process 520 may then supply the process manager 510, possibly by way of the message queue 608, state information relating to the new process 520 or the electronic device 300 in general, such as global state information.

The monitor thread 604 may also track which processes 520 are exiting, and perform the action identified in the configuration data 502 that is associated with that particular process 520. The monitor thread 604 may receive a signal from the exiting process or the main thread 602 indicating the process 520 that is exiting, in one example. In another embodiment, the main thread 602 may determine when a process 520 exits, and signify that event to the monitor thread 604, possibly along with the configuration data 502 indicating the action to be performed in response to the process 520 exiting. In yet another example, the main thread 602 may initiate the action listed in the configuration data 502 in response to the process 520 exiting.

The main thread 602 may also monitor the responsiveness of each process 520 executing within the electronic device 300. To this end, the main thread 602 may individually track the amount of time since each process last issued a watchdog message 614 to the message queue 608, thus indicating that the associated message is responsive, or "alive". In one example, for each executing process 520, the main thread 602 may implement a hardware or software timer loaded with the alive period associated with that process, as provided in the configuration data 520. If such a message 614 is received before the timer expires, the main thread 602 may then merely reset the timer. If, instead, the timer expires prior to receiving the watchdog message 614, the main thread 602 may then perform at least one action associated with the process 520 in the event the process 520 becomes unresponsive, as set forth in the configuration file 302, and as described above. The action may be any of terminating the process 520, starting a diagnostic process (such as one capable of helping to determine the cause of the unresponsiveness of the process 520), and restarting the electronic device 300. In other arrangements, either the monitor thread 604 or the watchdog thread 606 may perform these functions.

The watchdog thread 606 may also be utilized to monitor either or both of the main thread 602 and the monitor thread 604 for unresponsiveness. For example, each of the main thread 602 and the monitor thread 604 may set a recurring timer that, upon expiration, causes each of these threads 602, 604 to set an event or shared variable, send a signal, or transmit some other type of communication to the watchdog thread 606 to indicate the responsiveness of that thread 602, 604. Concurrently, the watchdog thread 606 may utilize its own timer for each of the main thread 602 and the monitor thread 604 such that expiration of the timer prior to reception of an event or signal from the associated thread 602, 604 may indicate that the thread 602, 604 is unresponsive. In one example, the watchdog timers employed in each of the main thread 602 and the monitor thread 604 employ a timer value less than that utilized by the watchdog thread 606 so that the watchdog thread 606 does not mistakenly determine the main thread 602 or the monitor thread 604 is unresponsive. If the watchdog thread 606 determines at least one of the other threads 602, 604 of the process manager 610 is unresponsive, the watchdog timer 606 may take some remedial action, such as restarting or rebooting the electronic device 300.

While FIG. 6 employs three separate threads 602, 604, 606 in the process manager 510, more or fewer threads may be employed therein while providing the same functionality described above.

Figure 7:
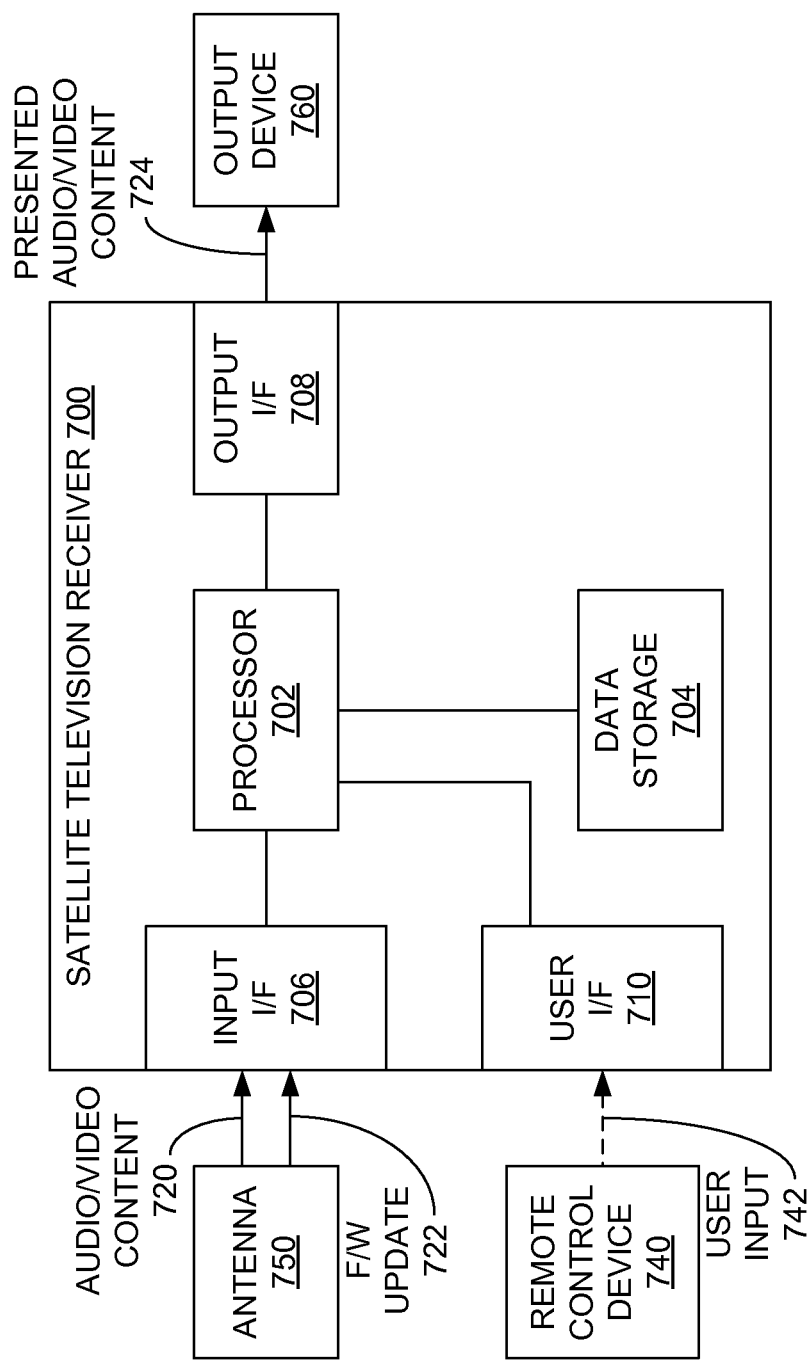
FIG. 7 is a block diagram of a satellite television receiver as an example of the electronic device of FIG. 3 according to an embodiment of the invention.

FIG. 7 provides an example of an electronic device that may employ the various concepts described above: a satellite television receiver 700 or set-top box for receiving audio/video programming, such as movies, sporting events, news programs, and other forms of audio/video information and entertainment, and presenting the programming to a user. Such a device may be considered one example of a device 300 incorporating an embedded computing system, as described above. However, other types of embedded computing systems, such as mobile communication devices, personal digital assistants (PDAs), televisions, audio receivers, compact disc (CD) and digital video disc (DVD) players, and digital video recorders (DVRs), as well as general-purpose computing systems, such as desktop and laptop computers, employing multiple processes for a plurality of operating modes represent other examples of the electronic device 300.

The receiver 700 includes a processor 702, data storage 704, an input interface 706, an output interface 708, and a user interface 710. Other components not explicitly shown in FIG. 7 may also be incorporated in the receiver 700 in other embodiments. The processor 702 is configured to control various aspects of the receiver 700 by executing instructions for multiple processes 520 and a process manager 510, as discussed above. The processor 702 may include one or more processors, such as microprocessors, microcontrollers, or digital signal processors (DSPs), configured to execute such instructions.

The data storage 704 of the receiver 700 is configured to store the software or firmware instructions for the processes 520 and the process manager 510 that are to be executed by the processor 304. Examples of the data storage 306 may include any single one of, of combination of, any digital data storage system or component capable of storing software or firmware instructions, as well as any data employed by the software or firmware. Such systems or components may include volatile memory, such as SRAM and DRAM, and/or nonvolatile memory, such as flash memory, magnetic hard disk drives, and optical disk drives.

The input interface 706 is configured to receive audio/video programming, and then convert the programming to a form more usable for processing within the receiver 700. Such conversion may include frequency down-conversion, amplification, reformatting, and other functions. Further, the input interface 706 may be coupled with or include a hyperboloid antenna 750 combined with a low-noise block-converter/feedhorn (LNBF), which collects and amplifies the incoming signals carrying the programming, and down-converts the signals from microwave frequencies to intermediate frequencies. The input interface 700 may also include at least one content channel selection resource, such as a tuner or similar circuitry, for selecting one or more of the audio/video programming channels being received, descrambler circuitry for descrambling the programming, and other circuitry. The input interface 706 may also receive metadata associated with the programming, such as data for an electronic program guide (EPG) indicating the programming channel and time at which each of the audio/video programs are broadcast.

The input interface 706 may also receive updates 722 to any firmware or software resident in the receiver 700. After the updates 722 have been received, the receiver 700 may transition from a "normal" operating mode or use case to a firmware or software "update" operating mode by way of the mode-switching operations discussed in detail hereinbefore.

The output interface 708 of the receiver 700 is configured to transfer audio/video programming 724 selected by a user to an output device 760, such as a television or video monitor. For example, the video portion of the audio/video programming may be delivered by way of a modulated video cable connection, a composite or component video RCA-style (Radio Corporation of America) connection, and a Digital Video Interface (DVI) or High-Definition Multimedia Interface (HDMI) connection. The audio portion of the programming may be transported over a monaural or stereo audio RCA-style connection, a TOSLINK connection, or over an HDMI connection. Other audio/video formats and related connections may be employed in other embodiments.

The user interface 710 of the receiver 700 is configured to receive user input 742 for operating the receiver 300, such as selecting a particular audio/video programming channel for viewing. The user interface 710 may provide either or both of a control panel connection located directly on a surface of the receiver 700, and a remote control interface. The remote control interface may receive the user input 742 from a remote control device 740 by way of commands transmitted over a radio frequency (RF) or infrared (IR) frequency band. Different communication methods, such as those employing optical or acoustic transmission of remote commands, may be used in other implementations.

At least some embodiments as described herein provide a firmware or software process management scheme for an electronic device, wherein switching from one operating mode or use case to another is regulated or controlled by way of data provided a configuration file. Such a configuration file may also provide control information tailored to each specific process, such as information regarding the spawning of processes by other processes, watchdog timing intervals, process post-exit actions, and input parameters for newly-initiated processes. Further, the configuration file may be expressed as an easily-generated text file which provides a number of security and control parameters that are individually determined for each process.

While several embodiments of the invention have been discussed herein, other implementations encompassed by the scope of the invention are possible. For example, while some embodiments disclosed herein have been described within the context of a satellite television receiver or set-top box, other embedded or general-purpose computing systems, including, but not limited to, cable and terrestrial television receivers, audio receivers, gaming consoles, DVRs, and CD and DVD players, may benefit from application of the concepts explicated above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of process management for facilitating switching of operating modes within an electronic device, the method comprising:
   in the electronic device, initiating a first process associated, in a configuration file stored in the electronic device, with a first operating mode of the electronic device, the configuration file including:
      a plurality of processes associated with the first operating mode;
      a plurality of processes associated with a second operating mode;
      for each of the first operating mode and the second operating mode, an indication as to whether the operating mode is a default operating mode;
      for each of the first operating mode and the second operating mode, a start up sequence of the plurality of processes associated with the operating mode; and
      for each process, an indication as to whether the process is authorized to request switching of operating mode of the electronic device;
   in the electronic device, receiving a request from the first process to switch to the second operating mode;
   in the electronic device, accessing configuration data to determine if the first process is authorized to issue the request, the configuration data having been derived from the configuration file and stored in the electronic device; and
   in response to the request, in the electronic device, if the first process is authorized to issue the request, initiating a second process associated in the configuration file with the second operating mode of the electronic device.

2. The method of claim 1, wherein:
   the first operating mode is a default operating mode as specified in the configuration file; and
   initiating the first process comprises initiating a first process in the startup sequence associated with the first operating mode in response to the electronic device being powered up.

3. The method of claim 1, further comprising:
   in the electronic device, in response to the request, determining if the first process is associated in the configuration file with the second operating mode of the electronic device; and
   in the electronic device, in response to the request, if the first process is not associated in the configuration file with the second operating mode, terminating the first process in response to the request.

4. The method of claim 1, further comprising:
   in the electronic device, initiating a first plurality of processes comprising the first process, wherein the first plurality of processes are associated in the configuration file with the first operating mode; and
   in the electronic device, initiating a second plurality of processes comprising the second process, wherein the second plurality of processes is associated in the configuration file with the second operating mode.

5. The method of claim 1, wherein:
   the first plurality of processes are initiated according to the start up sequence associated with the first operating mode in the configuration file; and
   the second plurality of processes are initiated according to the start up sequence associated with the second operating mode in the configuration file.

6. The method of claim 1, further comprising:
   in the electronic device, setting a first input parameter for the first process when initiating the first process, wherein the first input parameter is specified in the configuration file; and
   in the electronic device, setting a second input parameter for the second process when initiating the second process, wherein the second input parameter is specified in the configuration file.

7. The method of claim 1, wherein the configuration file further includes, for each process, an action associated with the process exiting, the method further comprises:
   in the electronic device, receiving an indication from the second process that the second process is exiting; and
   in the electronic device, in response to receiving the indication, performing the action associated with the second process exiting as indicated in the configuration file.

8. The method of claim 7, wherein:
   the action comprises one of restarting the second process, starting a diagnostic process, and restarting the electronic device.

9. The method of claim 1, further comprising:
   in the electronic device, determining that the second process is unresponsive; and
   in the electronic device, if the second process is unresponsive, performing an action associated with an unresponsive process as indicated in the configuration file.

10. The method of claim 9, wherein:
    the action comprises one of terminating the second process, starting a diagnostic process, and restarting the electronic device.

11. The method of claim 9, further comprising:
    setting a time period for the second process when initiating the second process, wherein the time period is specified in the configuration file;
    wherein the second process, when unresponsive, does not issue a notification message indicating the second process is responsive within the time period after a previous notification message.

12. The method of claim 1, further comprising:
    in the electronic device, receiving a second request from the first process to initiate a third process, wherein the configuration file comprises an indication as to whether the first process is authorized to issue the second request;

in the electronic device, determining by way of the configuration file whether the first process is authorized to issue the second request; and in the electronic device, if the first process is authorized to issue the second request, initiating the third process in response to the second request.

13. The method of claim 12, further comprising:
in the electronic device, receiving from the first process an input parameter for initiating the third process; and
in the electronic device, employing the input parameter when initiating the third process.

14. The method of claim 12, further comprising:
in the electronic device, notifying the first process that the third process was initiated.

15. A non-transitory computer-readable medium having encoded thereon instructions to be executed by a processor of an electronic device for performing:
initiating a first process associated, in a configuration file stored in the electronic device, with a first operating mode of the electronic device, the configuration file including:
- a plurality of processes associated with the first operating mode;
- a plurality of processes associated with a second operating mode;
- for each of the first operating mode and the second operating mode, an indication as to whether the operating mode is a default operating mode;
- for each of the first operating mode and the second operating mode, a start up sequence of the plurality of processes associated with the operating mode; and
- for each process, an indication as to whether the process is authorized to request switching of operating mode of the electronic device;

receiving a request from the first process to switch to the second operating mode;
accessing configuration data to determine if the first process is authorized to issue the request, the configuration data having been derived from the configuration file and stored in the electronic device; and
in response to the request, if the first process is authorized to issue the request, initiating a second process associated in the configuration file with the second operating mode of the electronic device.

16. An electronic device, comprising:
first data storage comprising instructions for each of a plurality of processes, instructions for a process manager, and configuration data, the configuration data indicating
- a plurality of processes associated with a first operating mode of the electronic device;
- a plurality of processes associated with a second operating mode of the electronic device;
- if each of the first operating mode and the second operating mode is a default operating mode;
- for each of the first operating mode and the second operating mode, a start up sequence for the plurality of processes associated with the operating mode, and
- for each process, if the process is authorized to request switching of operating mode of the electronic device; and a processor configured to execute the instructions for the process manager to:
- initiate execution of instructions for a first process, associated in the configuration data with the first operating mode of the electronic device,
- receive a request from the first process to switch to the second operating mode;
- access the configuration data to determine if the first process is authorized to issue the request; and
- in response to the request, if the first process is authorized to issue the request, initiate execution of instructions for a second process associated, in the configuration data, with the second operating mode.

17. The electronic device of claim 16, further comprising:
second data storage;
wherein the second data storage comprises the instructions for each of the plurality of processes, the instructions for the process manager, the configuration data, and instructions of a loader for loading the instructions for each of the plurality of processes, the instructions for the process manager, and the configuration data into the first data storage; and
wherein the processor is configured to execute the instructions of the loader to load the instructions for each of the plurality of processes, the instructions for the process manager, and the configuration data into the first data storage.

18. The electronic device of claim 17, wherein:
the configuration data is stored as a configuration text file in the second data storage.

19. The electronic device of claim 18, wherein the processor is further configured to execute the instructions of the loader to:
generate data structures in the first data storage, wherein the data structures comprise the configuration data from the configuration text file for use by the processor when executing the instructions of the process manager; and
delete the configuration text file from the second data storage after generating the data structures.

20. The electronic device of claim 17, further comprising:
a communication interface;
wherein the second data storage comprises nonvolatile memory;
wherein the first operating mode comprises a normal operating mode for the electronic device; and
wherein the second operating mode comprises a mode for updating at least a portion of the second data storage with data received over the communication interface.

* * * * *